(12) United States Patent
Chen et al.

(10) Patent No.: US 8,786,131 B2
(45) Date of Patent: Jul. 22, 2014

(54) UNINTERRUPTIBLE POWER SUPPLY AND METHOD FOR ENABLING THE SAME TO SAVE ENERGY

(75) Inventors: You Chen, Wuxi (CN); Yu Ma, Wuxi (CN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 237 days.

(21) Appl. No.: 12/791,125

(22) Filed: Jun. 1, 2010

(65) Prior Publication Data
US 2010/0301675 A1   Dec. 2, 2010

(30) Foreign Application Priority Data

Jun. 1, 2009   (CN) .......................... 2009 1 0145313

(51) Int. Cl.
*H02J 9/00*   (2006.01)
(52) U.S. Cl.
USPC ............ 307/64; 307/11; 307/17; 307/43; 307/65; 307/66; 363/34; 363/97; 320/132
(58) Field of Classification Search
USPC ............ 307/11, 17, 43, 64–66; 363/34, 97; 320/132
See application file for complete search history.

(56) References Cited

U.S. PATENT DOCUMENTS

| 4,313,060 | A |   | 1/1982 | Fickenscher et al. |
| 5,458,991 | A | * | 10/1995 | Severinsky ................... 429/61 |
| 5,684,686 | A | * | 11/1997 | Reddy ............................ 363/97 |
| 5,874,788 | A |   | 2/1999 | McCartney |
| 6,201,319 | B1 |   | 3/2001 | Simonelli et al. |
| 6,348,782 | B1 |   | 2/2002 | Oughton, Jr. et al. |
| 6,784,641 | B2 | * | 8/2004 | Sakai et al. ................. 320/132 |
| 7,129,593 | B2 | * | 10/2006 | King et al. .................... 290/4 C |
| 7,259,476 | B2 | * | 8/2007 | Frey ............................... 307/64 |
| 7,362,007 | B2 |   | 4/2008 | Farmer |
| 2004/0124710 | A1 | * | 7/2004 | Pfeiffer ......................... 307/64 |
| 2005/0078494 | A1 | * | 4/2005 | Aihara et al. .................. 363/37 |
| 2008/0088183 | A1 | * | 4/2008 | Eckroad et al. ............... 307/66 |
| 2010/0096928 | A1 | * | 4/2010 | Li et al. ......................... 307/66 |

* cited by examiner

*Primary Examiner* — Jared Fureman
*Assistant Examiner* — Alfonso Perez Borroto
(74) *Attorney, Agent, or Firm* — Armstrong Teasdale LLP

(57) ABSTRACT

An uninterruptible power supply configured to automatically detect a load level and automatically power off and disable power supply or automatically power on and enable the power supply based on a detected load level, so that energy of a backup source of the uninterruptible power supply is not wasted and a life-cycle of the uninterruptible power supply is extended.

17 Claims, 3 Drawing Sheets

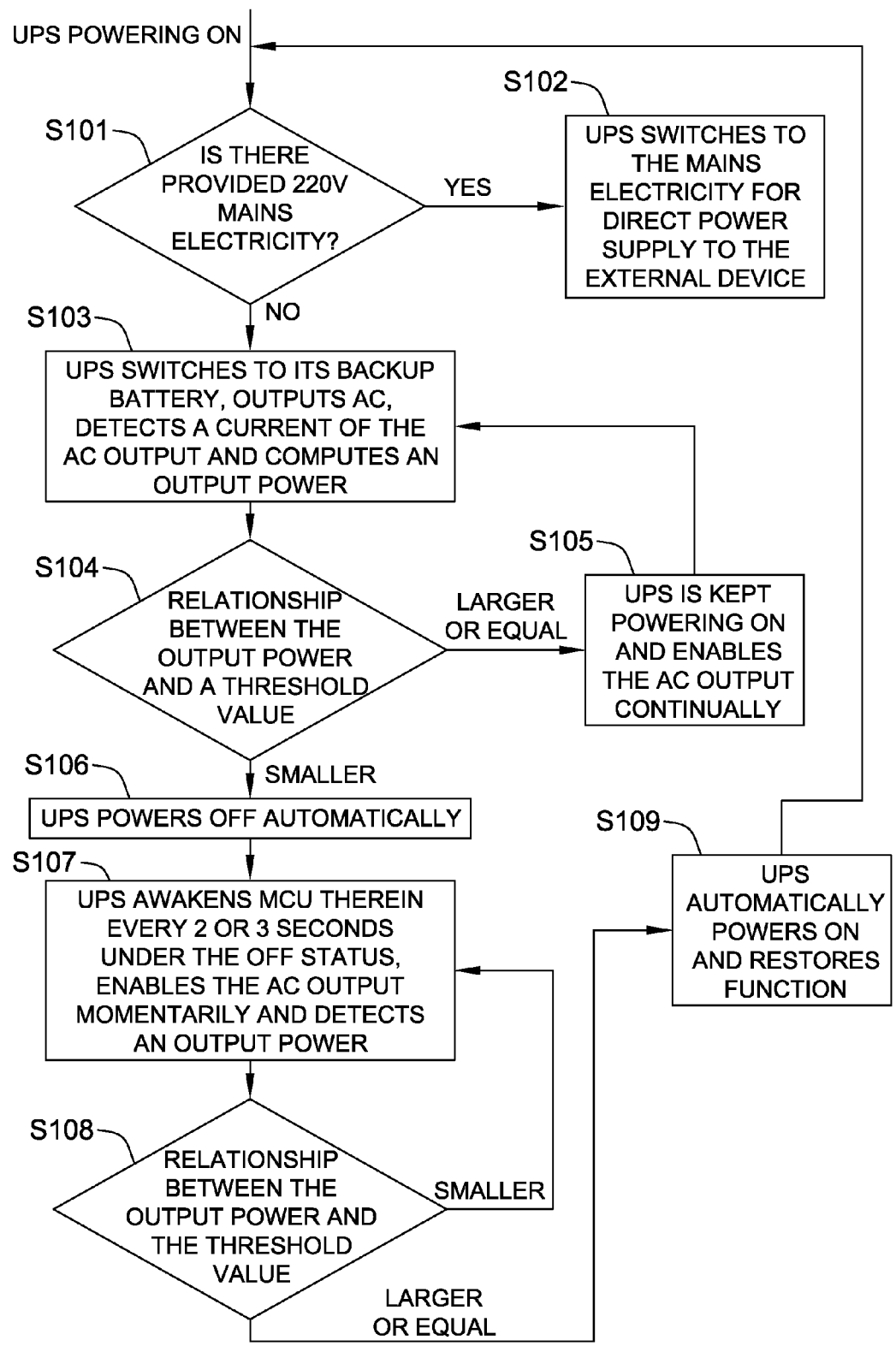

UNINTERRUPTIBLE POWER SUPPLY AND METHOD FOR ENABLING THE SAME TO SAVE ENERGY

CROSS REFERENCE TO RELATED APPLICATIONS

This application claims the benefit of Chinese Patent Application No. 200910145313.5 filed Jun. 1, 2009, which is hereby incorporated by reference in its entirety.

BACKGROUND OF THE INVENTION

Embodiments described herein relate to an uninterruptible power supply (UPS).

As the electronic technology continues to develop, the requirement for the quality of power supply systems also rises constantly. Since UPS can provide a load in time with continuous, stable and pure AC sine wave power when the load is disconnected abruptly so as to avoid accidents such as data loss and error, device damage or uncontrolled crash, operation cease, etc., it has been widely used in industries that employ electronic devices.

In general, as a backup power supply apparatus for electronic devices, the UPS, when the mains electricity is normally inputted, regulates the power and then supplies it to the load, and meanwhile, a built-in battery of the UPS machine is charged and energy is stored in the battery; whereas when the mains electricity is disrupted suddenly (accidental power cut), the UPS immediately converts the energy in the built-in battery into AC power for continued use by the load, enabling the load to maintain normal operation and protecting the load from both software and hardware damages.

However, people attach basically most importance to the quality of power supplied by the UPS to a load while care less about the status of the UPS when the load is unused or powered off. In that case, the UPS is usually left to remain powering on, which means that the UPS wastes its backup energy and enters a small-current (silk-current) discharging cycle. Generally, UPS has only several hundred discharging cycles, and more wasting means shorter life-cycle, which is not good for users.

BRIEF DESCRIPTION OF THE INVENTION

One aspect of the present invention is an uninterruptible power supply which can automatically power off based on load levels so as to reduce waste of its backup source energy.

Another aspect of the present invention is an uninterruptible power supply which can start up automatically based on load levels.

A further aspect of the present invention is a method for enabling the uninterruptible power supply to save energy.

The "load level" as referred to here means the size of the electrical coupling of the load.

According to one aspect of the present invention, an uninterruptible power supply is provided, which has a standby mode and a backup mode and which is capable of automatic detection of a load level. Under the backup mode, when the load level is detected below a specified level, the uninterruptible power supply automatically powers off and disables the power supply.

According to the above uninterruptible power supply of the present invention, under the standby mode, when the load level is detected increasing to said specified level, the uninterruptible power supply automatically powers on and enables the power supply.

According to the above uninterruptible power supply of the present invention, if said load has a backup battery, the uninterruptible power supply will detect a load level larger than or equal to said specified level when the load is in a non-working state and its backup battery power is not complete, where the uninterruptible power supply will remain in the backup mode and charge the backup battery of the load until the power thereof is complete. After the backup battery of the load is charged with complete power, the uninterruptible power supply will detect a load level smaller than said specified level, where the uninterruptible power supply automatically shuts down the backup battery and cuts off the AC output to thus enter in the standby mode.

According to the above uninterruptible power supply of the present invention, it comprises: an input unit for receiving AC input power from an AC source; a control unit coupled to the input unit and an output unit, for controlling an operating mode of the uninterruptible power supply; an output unit controlled by the control unit on whether it supplies power to the load; wherein said control unit is further for automatically detecting a load level and enabling the uninterruptible power supply to automatically power off and stop the power supply or to automatically power on and start the power supply according to the detected load level. The control unit may be implemented by a microprocessor, e.g. a unit machine.

According to the above uninterruptible power supply of the present invention, said control unit comprises: a current sensor for sensing a current of the load, which may be implemented by a Hall sensor or a current sampling resistance; a detection unit for processing the load current sensed by the current sensor; a judgment unit for judging whether the detected load level is above a specified level based on the current from the detection unit. Optionally, the current sensor and detection unit in said control unit may be also separated therefrom to become independent units.

According to the above uninterruptible power supply of the present invention, said control unit further comprises: a timed wakeup unit for waking up the UPS every a specified time interval when the uninterruptible power supply is in the standby mode and enabling the AC output by the output unit in a very short time so as to detect the load level, wherein when the load level is above a specified level, the uninterruptible power supply is enabled to power on and start the power supply, whereas when the load level is below the specified level, the control unit sleeps again and the uninterruptible power supply enters the standby mode.

According to the above uninterruptible power supply of the present invention, the division of units therein may be properly adjusted based on needs and functions, which is not confined to the case described above.

According to another aspect of the present invention, a method for enabling an uninterruptible power supply to save energy is provided, wherein the uninterruptible power supply is capable of automatically detecting a load level, and when the detected load level is below a specified level, the uninterruptible power supply automatically powers off and disables the power supply.

According to the above method of the present invention, it comprises the steps of: detecting whether the uninterruptible power supply is connected with an external AC source; if the detection is positive, switching from the uninterruptible power supply to the external AC source for direct power supply to the load; if the detection is negative, switching to the internal backup battery of the uninterruptible power supply for the power supply; detecting an AC output current of the load and calculating an output power of the load when the power is supplied from the backup battery of the uninterruptible power supply; comparing the output power of the load with a specified level, wherein when the output power is above the specified level, the uninterruptible power supply continually enables the AC output, and when it is below the specified level, the uninterruptible power supply enters the standby mode.

According to the above method of the present invention, when the uninterruptible power supply is in the standby mode and detects a load level above said specified level, the uninterruptible power supply automatically powers on and enables the power supply.

According to the above method of the present invention, when the uninterruptible power supply is in the standby mode, it awakens every a predetermined time interval, enables an AC output momentarily, detects the AC output level and compares the detected level with said specified level, wherein when it is above said specified level, the uninterruptible power supply automatically powers on, and when it is below said specified level, the uninterruptible power supply enters the standby mode again.

The uninterruptible power supply according to the present invention will automatically power off or disable the AC output when the load falls below a specified level, thus enabling that the UPS automatically powers off as the user sets it aside, whereby it is prevented that the uninterruptible power supply wastes energy in a non-backup mode, and the UPS backup energy is saved to extend its life-cycle. However, when the UPS output load is bigger than the specified level, the UPS will power on or enable automatic activation of the AC output, so that the user is only required to control the operating system, namely the load, without need to care for the UPS.

BRIEF DESCRIPTION OF THE DRAWINGS

FIG. 3 is flow chart illustrating a process for enabling the UPS to save energy.

DETAILED DESCRIPTION OF THE INVENTION

The present invention is further described below in detail through embodiments and in conjunction with the drawings, but the invention is not only limited to the descriptions here.

Figure 1:
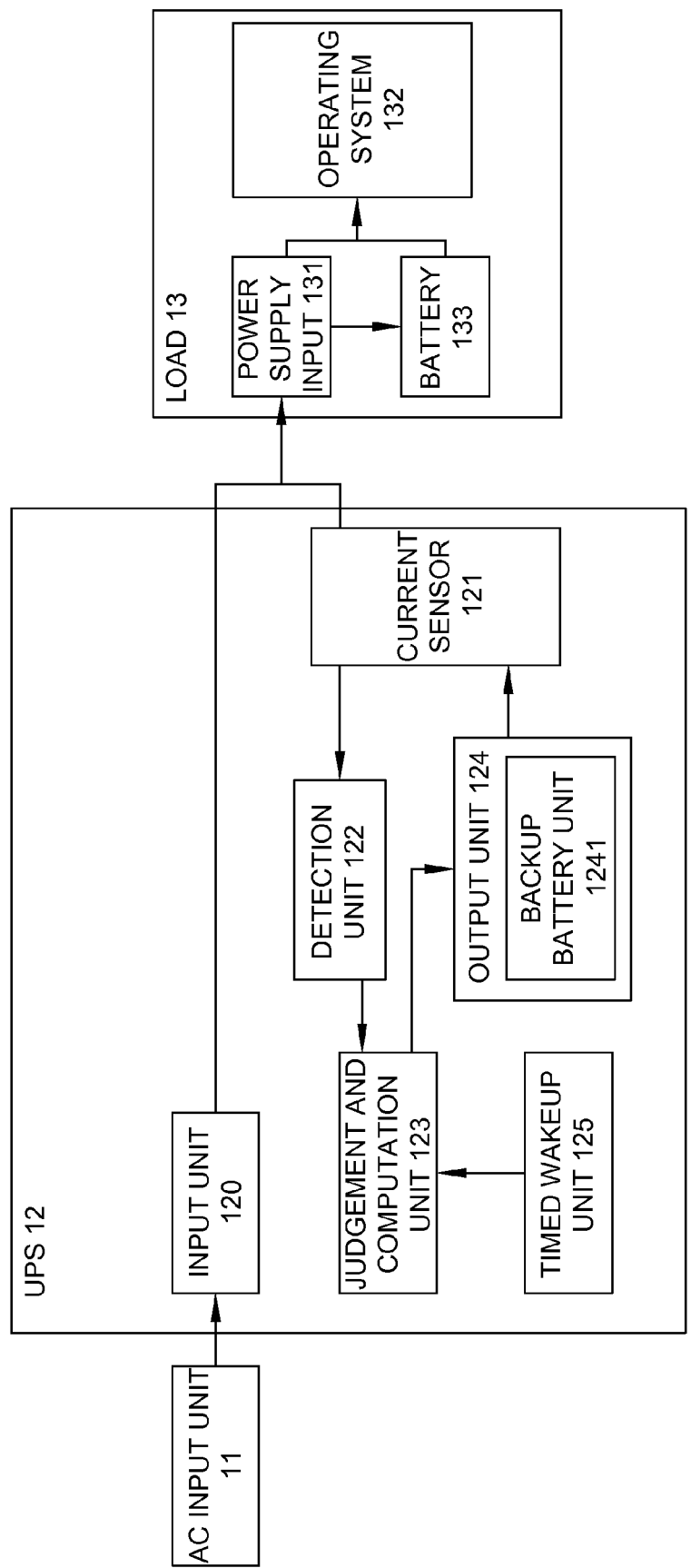
FIG. 1 is a block diagram illustrating a system using a UPS according to the present invention.

FIG. 1 is a block diagram illustrating a system using a UPS according to the present invention. As shown in FIG. 1, the system comprises AC input source 11, a UPS 12 and a load 13, wherein the load 13 is connected to the AC input source 11 via the UPS 12. Here the AC input source 11 may be a power supply socket arranged on a wall, which is connected to the mains electricity. The load 13 represents all electronic devices to which the UPS 12 can be applied, such as a computer, and has a power supply input terminal 131, an operation system 132 and optionally, a battery 133. The UPS 12 has a standby mode (i.e. supplying power to the external devices without using the energy stored in its backup supply unit) and a backup mode (i.e. supplying power to the external devices by using the energy stored in its backup supply unit), and when the AC input source 11 is available for power supply, the UPS 12 operates in the standby mode and only acts to transfer the AC power from the AC input source 11 to the load 13. When the AC input source 11 is not available for power supply, the UPS 12 operates in the backup mode, supplying power to the load by using the energy stored in its backup supply unit (e.g. a battery).

In the system as shown in FIG. 1, the UPS 12 comprises an input unit 120, a current sensor 121, a detection unit 122, a judgment unit 123 and an output unit 124 in which a backup supply unit 1241 is provided. Therein, the input unit 120 which, for example, may be a power supply input interface for the UPS, serves to receive AC power from the AC input source 11 and transfers the power to the load. The current sensor 121 which, for example, may be a Hall sensor or a current sampling resistance, serves to sense a load current and transmits the sensed load current to the detection unit 122. The detection unit 122, for example, may include a computing amplifier, an A/D converter, etc., and when the UPS 12 is in the backup mode, the detection unit 122 carries out processes such as filtering, amplification and A/D conversion of the current from the current sensor 121, and then transmits it to the judgment unit 123. The judgment unit 123 computes a load power W based on the processed current sent from the detection unit 122 and compares the computed load power W with a predetermined load power value $W_T$; when $W>=W_T$, it indicates that the UPS 12 is connected with a load and the load is in a working or charged state, where the judgment unit 123 outputs a control signal to the output unit 124, causing the backup supply unit 1241 therein to operate to supply power to the load; when $W<W_T$, it indicates that the load connected to the UPS is not in a working or charged state, or the load is already disconnected from the power supply, where the judgment unit 123 outputs a control signal to the output unit 124, causing the backup supply unit 1241 therein to enter a sleep state or to automatically power off to disable the AC output. Therein, $W_T$ can be set by a user according to the load status. In the above embodiment, the load level is judged by using the physical quantity "power", but alternatively, the load level can be also judged by using current, etc. according to varied cases, where the judgment unit can omit the process of computation.

In order to make the UPS of the present invention more convenient for use, a timed wakeup unit 125 may be provided in the UPS, which awakens the detection unit 122 and the judgment unit 123 of the UPS every two or three seconds and enables the output unit 124 in a very short time interval to output AC power (e.g. <=50 ms) so as to detect the AC output load, i.e. a load current is detected by the current sensor and then processed by the detection unit, and a power is computed by the judgment unit and then compared with $W_T$; if the AC output power then is larger than $W_T$, the UPS will automatically powers on and enables the AC output; otherwise, the detection unit 122 and the judgment unit 123 will sleep again, and the UPS returns to the standby mode. The timed wakeup unit 125 is configured to guarantee that the UPS may return to work and provide in time the power supply to the load 13 when the load (e.g. a portable electronic device) is inserted back to the UPS or powered on again.

Additionally, if the load has a backup battery, when the load is not working and the battery is not in complete power, the UPS will detect a result of the AC output load larger than $W_T$, and the UPS will not power off, but rather charges the backup battery of the load via a power supply input of the load until the power thereof is complete. When the backup battery of the load is charged completely, the UPS will detect the output power of the load falling below $W_T$, where the UPS automatically shuts down and cuts off the AC output.

Figure 2:
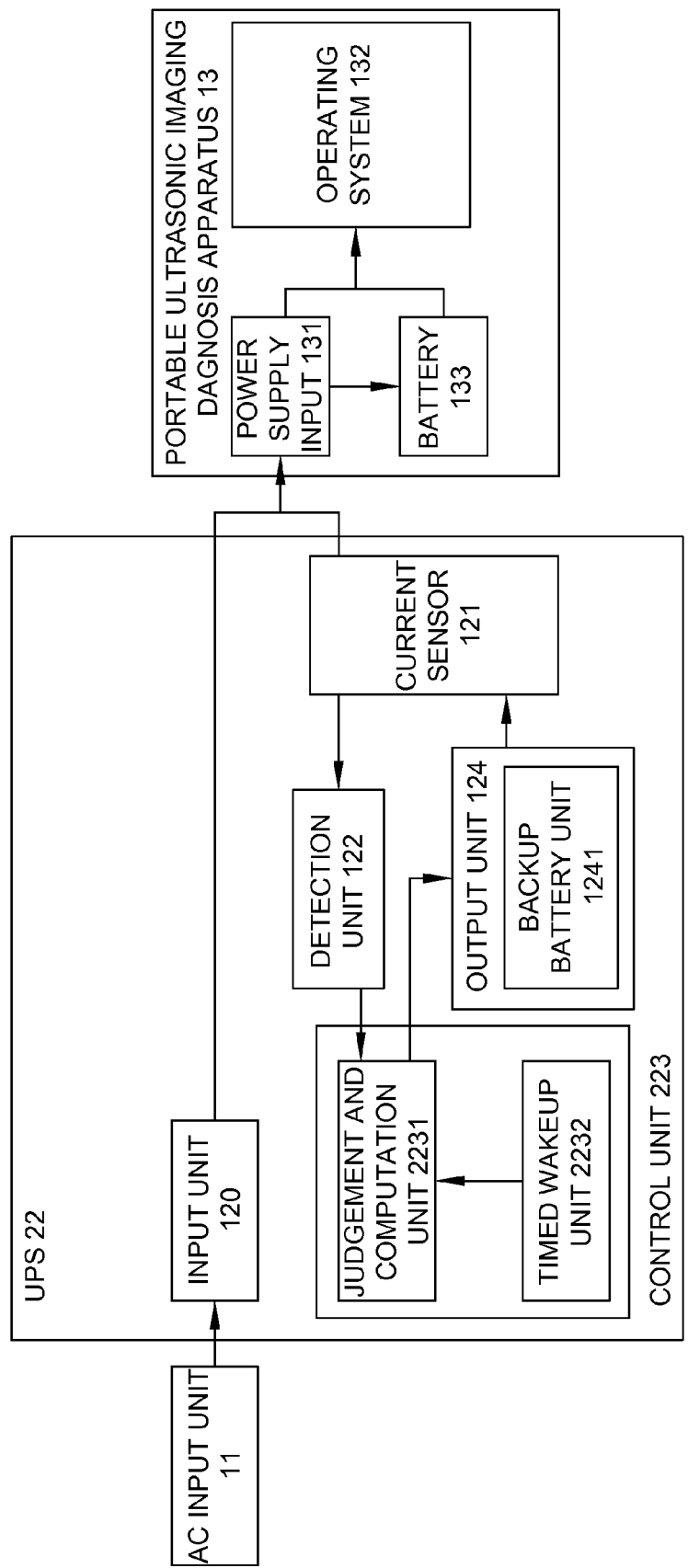
FIG. 2 is a block diagram illustrating a control unit in the UPS according to the present invention.

FIG. 1 only indicatively shows the structure of a UPS according to the present invention. A skilled person in the art should understand that the units in the UPS can be either mutually independent units which are implemented by independent software, hardware or a combination of software and hardware, or implemented by one single unit to perform the several functions. For example, optically, the current sensor 121 may be incorporated into the detection unit to form a detection unit with current sensing function; optionally, the detection unit 122, the judgment 123 and the timed wakeup unit 125 in FIG. 1 may be combined together to form a control unit, the functions of the three units being carried out by a microprocessor (e.g. a unit machine), or alternatively, only the judgment 123 and the timed wakeup unit 125 in FIG. 1 are combined together to form a control unit, the functions of the two units being carried out by a microprocessor (e.g. a unit machine). FIG. 2, for example, exhibits a diagram of a UPS according to the present invention being applied to a portable ultrasonic imaging diagnosis apparatus. For convenience, the same or similar components in FIG. 2 and FIG. 1 are denoted with the same reference signs. As shown in FIG. 2, the load is embodied as a portable ultrasonic imaging diagnosis apparatus which has a power supply input 131, an operating system 132 and a battery 133. The UPS 22 in FIG. 2 differs from the UPS 12 in FIG. 1 in that the judgment unit 2231 and the timed wakeup unit 2232 are combined into one module, i.e. a control unit 223, which is implemented by a microprocessor MCU (e.g. a unit machine), and then a control signal generated by the control unit 223 controls the output unit on whether to supply power to the load 13 (i.e. the portable ultrasonic imaging diagnosis apparatus).

In addition, optionally, a unit shown in FIG. 1 can be further subdivided into two or more units to perform its functions respectively. For example, the judgment unit may be divided into two units, namely a computation unit and a determination unit.

Furthermore, optionally, the functions of the units shown in FIG. 1 may be adjusted according to needs. For example, when load power is adopted as the physical quantity for judging the load level, the computation process conducted in the above judgment unit 123 may be alternatively conducted in the detection unit 122.

In addition, the present application mentions only the components in the UPS that are related to the present invention and does not describe the other components for simplification of the description. However, the other components in the known UPS may be combined as well into the present invention, e.g. a switch unit for switching between the direct power supply by the AC input source and the power supply by the UPS, and a rectifier for regulating the UPS, etc.

The UPS apparatus according to the present invention is especially adapted for electronic devices that are frequently pluggable and free from long-hour continuous operation, such as a notebook computer, a portable ultrasonic imaging diagnosis apparatus, etc. The present invention, while ensuring in-time power supply for these electronic devices, can also save its own electrical power and extend its life-cycle. FIG. 3 exhibits a method for enabling a UPS to save power according to the present invention. As shown in FIG. 3, the UPS, upon powering on, detects first whether there is connected an external AC power source, i.e. step S101. When the UPS detects the connection of an external AC power source, it enters step S102, where the UPS is switched to the external AC power source for direct power supply to an external load; whereas when the UPS detects no connection of an external AC power source, it enters step S103, where the UPS is switched to its internal backup battery for the power supply, outputs AC power, and meanwhile detects a current of the AC output and computes an output power. Then it enters step S104 to compare the output power with a predetermined threshold value. When the output power is larger than or equal to the predetermined threshold value, it indicates that the load needs power supply, and the process goes to step S105, where the UPS is left in the powering on state to enable the AC output continually; when the output power is smaller than the predetermined threshold value, it indicates that the load needs no power supply, and the process goes to step S106, where the UPS automatically powers off. In the standby mode, the UPS awakens a controller therein, e.g. MCU (microprocessor, e.g. a unit machine), once each a predetermined time interval (2 or 3 seconds for example) and momentarily enables the AC output to detect the AC output power, i.e. step S107. Then at step S108, the output power is compared with the predetermined threshold value. When the output power is smaller than the predetermined threshold value, it indicates that there is no load in need of power supply, and the UPS enters the sleep state again and returns to step S107; whereas when the output power is larger than or equal to the predetermined threshold value, it indicates that there is a load in need of power supply, and then the process goes to S109, where the UPS automatically powers on and restores its power supply function.

Described above are merely embodiments of the present invention. It should be noted that an ordinarily skilled person in the art, with no departure from the spirit of the present invention, may work out some improvements, modifications and deformations which should all be regarded as falling within the scope of protection under the present application.

What is claimed is:

1. An uninterruptible power supply having a standby mode and a backup mode, the uninterruptible power supply comprising:
    an input unit configured to receive AC input power from an AC source;
    a control unit coupled to the input unit; and
    an output unit coupled to the control unit and configured to supply AC output power to a load;
    wherein the control unit is configured to:
        automatically detect a load level measurement;
        determine whether the uninterruptible power supply is operating in the backup mode or the standby mode based on whether power is being supplied to a load from the uninterruptible power supply, wherein the backup mode is determined when the uninterruptible power supply supplies power to the load and the standby mode is determined when the uninterruptable power supply does not supply the power to the load;
        automatically power off to disable the power supplies to the load when operating in the backup mode and when the detected load level measurement is less than a predetermined value; and
        automatically power on and start supplying power to the load according to the detected load level measurement.

2. The uninterruptible power supply according to claim 1, wherein when operating in the standby mode and when the detected load level measurement is greater than the predetermined value, the uninterruptible power supply is configured to automatically power on to enable the power supply to the load.

3. The uninterruptible power supply according to claim 2, wherein the load level measurement is an output power of the load.

4. The uninterruptible power supply according to claim 1, wherein the load has a backup battery and the control unit is further configured to:
    determine that the detected load level measurement is greater than or equal to the predetermined value when the load is in a non-working state and a power of the backup battery is not complete;

continue operating in the backup mode to charge the backup battery of the load until the power of the backup battery is complete; and determine that the detected load level measurement is less than the specified value, automatically shut down the backup battery, and cut off an AC output to enter the standby mode after the backup battery of the load is charged to complete power.

5. The uninterruptible power supply according to claim 1, wherein the control unit is further configured to control an operating mode of the uninterruptible power supply and automatically detect the load level-measurement to enable the uninterruptible power supply to automatically power off and stop supplying power to the load.

6. The uninterruptible power supply according to claim 5, wherein the control unit comprises:
   a current sensor configured to sense a current of the load as the detected load level measurement;
   a detection unit configured to process the load current sensed by the current sensor; and
   a judgment unit configured to determine whether the detected load level measurement is greater than the predetermined value based on the current from the detection unit.

7. The uninterruptible power supply according to claim 6, wherein the control unit further comprises a timed wakeup unit configured to:
   wake the uninterruptible power supply at a specified time interval when the uninterruptible power supply is in the standby mode and to enable AC power output by the output unit in a very short time interval to detect the load level measurement;
   enable the uninterruptible power supply to power on and start supplying power to the load when the detected load level measurement is above the predetermined value; and
   sleep the control unit and enable the uninterruptible power supply to enter the standby mode when the detected load level measurement is below the predetermined value.

8. The uninterruptible power supply according to claim 6, wherein the current sensor comprises a Hall sensor or a current sampling resistance.

9. The uninterruptible power supply according to claim 1, wherein the control unit comprises a microprocessor.

10. The uninterruptible power supply according to claim 1, further comprising:
    a current sensor configured to sense a current of the load as the detected load level measurement; and
    a detection unit configured to process the load current sensed by the current sensor;
    wherein the control unit is further configured to enable the uninterruptible power supply to automatically power off and stop the power supply or to automatically power on and start the power supply based on the detected load level measurement.

11. The uninterruptible power supply according to claim 10, wherein the control unit comprises:
    a judgment unit configured to determine whether the detected load level measurement is greater than the predetermined value based on the current from the detection unit.

12. The uninterruptible power supply according to claim 11, wherein the control unit further comprises a timed wakeup unit configured to:
    wake the uninterruptible power supply at a specified time interval when the uninterruptible power supply is in the standby mode and to enable AC power output by the output unit in a very short time interval to detect the load level measurement;
    enable the uninterruptible power supply to power on and start supplying power to the load when the detected load level measurement is above the predetermined value; and
    sleep the control unit and enable the uninterruptible power supply to enter the standby mode when the detected load level measurement is below predetermined value.

13. The uninterruptible power supply according to claim 1, wherein the load level measurement is an output power of the load.

14. A method for enabling an uninterruptible power supply to save energy, the method comprising:
    supplying AC output power to a load;
    automatically detecting a load level measurement;
    determining whether the uninterruptible power supply is operating in the backup mode or the standby mode based on whether AC output power is being supplied to a load from the uninterruptible power supply, wherein the backup mode is determined when the uninterruptible power supply supplies AC output power to the load and the standby mode is determined when the uninterruptable power supply does not supply the AC output power to the load;
    automatically powering off the uninterruptible power supply and disabling power supply to the load when the uninterruptible power supply is in the backup mode and the load level measurement is less than a predetermined value; and
    automatically powering on the uninterruptible power supply and enabling the power supply to the load when the uninterruptible power supply is in the standby mode and the load level measurement is above the predetermined value.

15. The method according to claim 14, further comprising:
    detecting whether the uninterruptible power supply is connected with an external AC source;
    if the detection is positive, switching from the uninterruptible power supply to an external AC source for direct power supply to the load;
    if the detection is negative, switching to an internal backup battery of the uninterruptible power supply for the power supply;
    detecting an AC output current of the load and calculating an output power of the load as the load level measurement when power is supplied from the backup battery of the uninterruptible power supply;
    comparing the output power of the load with the predetermined value;
    when the output power is greater than the predetermined value, continually enabling the AC output; and
    when the output power is less than the predetermined value, entering a standby mode.

16. The method according to claim 15, further comprising automatically powering on the uninterruptible power supply and enabling the power supply to the load when the uninterruptible power supply is in the standby mode and the load level measurement is above the predetermined value.

17. The method according to claim 14, further comprising:
    awakening the uninterruptible power supply at a predetermined time interval when the uninterruptible power supply is in the standby mode;
    enabling an AC output for a specified time period;

detecting the AC output level as the load level measurement and comparing the detected AC output level to the predetermined value;

when the detected AC output level is greater than predetermined value, automatically powering on the uninterruptible power supply; and when the detected AC output level is less than predetermined value, re-entering the standby mode.

* * * * *